United States Patent [19]
Shiau et al.

[11] Patent Number: 5,903,361
[45] Date of Patent: *May 11, 1999

[54] METHOD AND SYSTEM FOR PROCESSING IMAGE INFORMATION USING BACKGROUND ERROR DIFFUSION

[75] Inventors: Jeng-Nan Shiau, Webster; David J. Metcalfe, Marion, both of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/660,041

[22] Filed: Jun. 6, 1996

[51] Int. Cl.⁶ ............................. H04N 1/40; G06K 9/36; G06K 9/40
[52] U.S. Cl. ........................ 358/455; 358/456; 358/467; 382/252; 382/261
[58] Field of Search ................................... 358/455, 456, 358/457, 461, 462, 465, 466, 467, 468; 382/252, 260, 261, 262, 263, 264, 265

[56] References Cited

U.S. PATENT DOCUMENTS

| | | | |
|---|---|---|---|
| 4,829,587 | 5/1989 | Glazer et al. | 382/299 |
| 5,121,447 | 6/1992 | Tanioka et al. | 382/252 |
| 5,243,445 | 9/1993 | Koike | 358/467 |
| 5,258,854 | 11/1993 | Eschbach | 358/445 |
| 5,271,070 | 12/1993 | Truong et al. | 382/234 |
| 5,274,472 | 12/1993 | Williams | 358/455 |
| 5,291,309 | 3/1994 | Semasa | 358/455 |
| 5,317,653 | 5/1994 | Eschbach et al. | 382/252 |
| 5,327,256 | 7/1994 | Kang et al. | 358/445 |
| 5,410,615 | 4/1995 | Mailloux | 382/299 |
| 5,442,461 | 8/1995 | Levien | 358/456 |
| 5,528,384 | 6/1996 | Metcalfe et al. | 358/447 |
| 5,659,402 | 8/1997 | Fujita et al. | 358/467 |
| 5,768,432 | 6/1998 | Schweid | 358/456 |

OTHER PUBLICATIONS

A Survey of Electronic Techniques for Pictorial Reproduction by J.C. Stoffel and J.F. Moreland IEEE Transactions on Communications, vol. Com–29, No. 12, Dec. 1981. pp. 1898–1925.

Primary Examiner—Kim Yen Vu
Assistant Examiner—Kimberly A. Williams
Attorney, Agent, or Firm—Michael J. Nickerson

[57] ABSTRACT

A method and system assigns an image classification to a multi-level grey scale pixel value. The multi-level grey scale pixel value is modified based on an error generated by previously processed pixels and the image classification of the multi-level grey scale pixel and processed based on the assigned image classification to reduce the number of grey levels in the multi-level grey scale pixel value. An error is generated based on the processing of the modified multi-level grey scale pixel value and a portion of the error is diffused to a next pixel in a fastscan direction and a remaining portion of the error is diffused to pixels in a slowscan direction. The modified multi-level grey scale pixel value referred above includes an error from the previously processed neighboring pixels if the current pixel is classified as being processed as an error diffused pixel. The modified multi-level grey scale pixel value equals to the original pixel value if the current pixel is classified as being processed as a non-error diffused pixel.

21 Claims, 8 Drawing Sheets

METHOD AND SYSTEM FOR PROCESSING IMAGE INFORMATION USING BACKGROUND ERROR DIFFUSION

FIELD OF THE PRESENT INVENTION

The present invention relates to the conversion of images from multi-level grey scale pixel values to a reduced number of levels pixel values. More specifically, the present invention relates to the conversion of multi-level grey scale pixel values to a reduced number of levels pixel values using a background error diffusion technique.

BACKGROUND OF THE PRESENT INVENTION

Image information, be it color or black and white, is commonly derived by scanning, initially at least, in a grey level format containing a large number of levels, e.g.: 256 levels for black and white and more than 16 million ($256^3$) levels for color. This multi-level format is usually unprintable by standard printers.

The term "grey level" is used to described such data for both black and white and color applications. Standard printers print in a limited number of levels, either a spot or a no spot in the binary case, or a limited number of levels associated with the spot, for example, four in the quaternary case. Since grey level image data may be represented by very large values, it is necessary to reduce grey level image data to a limited number of levels so that it is printable. Besides grey level image information derived by scanning, certain processing techniques, such as computer generation, produce grey level pixel values which require such a conversion.

One such method for reducing the grey levels of a pixel is conventional error diffusion. In conventional error diffusion, the video signal for pixel X is modified to include the accumulated error diffused to this pixel from previous threshold processes. The modified video signal value X is compared with a threshold value 128, assuming a video range between 0 and 255. If it is determined that the modified video signal value X is greater than or equal to 128, the process outputs a value to indicate the turning ON of pixel X. The process then calculates the error associated with the threshold process wherein this error, Y, is calculate as being X–255.

On the other hand, if it is determined that the modified video signal value X is less than the threshold value 128, a signal is output indicating that the pixel X is to be turned OFF. The process then produces the error, Y, which is calculated as being equal to the value X.

The error is multiplied by weighting coefficients and distributed to downstream pixels. Thus, the error from the threshold process is diffused to adjacent pixels.

In describing the error diffusion process, it is assumed that the video value is in a range between 0 and 255. However, any chosen range for the video signal can be utilized. As described above, in conventional error diffusion methods, the binarization of the pixel or the reduction of its grey level is determined by comparing a modified input with a threshold. The modified input video signal is the input video signal, V, plus an accumulated error term, $e_i$, determined from the processing of previous pixels.

Although conventional error diffusion renders a quality image, the process has problems when utilized with a segmented image. More specifically, in a segmented document, there may be numerous non-error diffused regions where different image processing rendering is desired, such as screening or thresholding. In these "non-error diffused" regions, the error diffusion calculation is not conventionally generated. Such a situation, however, is not conducive when attempting to render a smooth transition when entering the border areas of error diffused regions since the error that should be used would be based upon the image context surrounding this area. In other words, the error propagated to a pixel should always be based upon the surrounding video information when calculating the error. Typically, when encountering this situation, the error information to be used as entering the error diffused area is assumed to be based upon a pure OFF page "white background", but this assumption renders undesirable artifacts in the non-error diffused and error-diffused interface area.

The present invention proposes a method in which the error inside of non-error-diffused area regions is calculated and stored, thereby improving the image quality of segmented documents that mix these two image processing techniques.

SUMMARY OF THE PRESENT INVENTION

A first aspect of the present invention is a method of reducing a number of levels in a multi-level grey scale pixel value representing a pixel. The method assigns an image classification to a multi-level grey scale pixel value of a first resolution; modifies the multi-level grey scale pixel value based on the image classification of the multi-level grey scale pixel; adds an error generated from previously processed neighboring pixels is to the modified pixel value, if the pixel is classified as an error diffused pixel and no error to the modified pixel value if the pixel is classified as a non-error diffused pixel; processes the modified multi-level grey scale pixel value based on the assigned image classification to reduce the number of grey levels in the multi-level grey scale pixel value; generates an error based on the processing of the modified multi-level grey scale pixel value; diffuses a portion of the error to a next pixel in a fastscan direction; and diffuses a remaining portion of the error to pixels in a slowscan direction.

A second aspect of the present invention is a system for reducing a number of levels in a multi-level grey scale pixel value representing a pixel. The system includes segmentation means for assigning an image classification to a multi-level grey scale pixel value of a first resolution; modifying means for modifying the multi-level grey scale pixel value based on an error generated by a previously processed pixel and the image classification of the multi-level grey scale pixel; image processing means for processing the modified multi-level grey scale pixel value based on the assigned image classification to reduce the number of grey levels in the multi-level grey scale pixel value; error means for generating an error based on the processing of the modified multi-level grey scale pixel value; and diffusion means for diffusing a portion of the error to a next pixel in a fastscan direction and diffusing a remaining portion of the error to pixels in a slowscan direction. The modifying means adds an error generated by previously processed neighboring pixels if the pixel is classified to be processed as an error diffused pixel and adds no error to the pixel if it is classified to be processed as a non-error diffused pixel.

A third aspect of the present invention is a method of reducing a number of levels in a multi-level grey scale pixel value representing a pixel. The method processes a first multi-level grey scale pixel value of a first resolution using a non-error diffusion process; generates an error from processing the first multi-level grey scale pixel value; diffuses the error generated from processing the first multi-level grey scale pixel value to adjacent pixels; processes a second multi-level grey scale pixel value using an error diffusion process and a portion of the diffused error diffused; generates an error based on the processing of the second multi-level grey scale pixel value; and diffuses the error generated from processing the second multi-level grey scale pixel value to adjacent pixels.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustration purposes only and should not be limitative of the scope of the present invention, wherein:

FIG. 10 shows a graphical representation illustrating a decoding process illustrated in FIG. 9;

FIG. 11 shows a graphical representation illustrating the obtaining boundary subpixel values in parallel with the computing a desired output value;

FIG. 12 shows a graphical representation illustrating the interpolating of subpixel values between the obtained boundary subpixel values in parallel with the modifying of the desired output value with an error component;

FIG. 13 shows a graphical representation illustrating the modifying of the subpixel values between the obtained boundary subpixel values with an error component;

FIG. 14 shows a graphical representation illustrating the calculation of a plurality of partial possible error values;

FIG. 15 shows a graphical representation of further modifying the modified subpixel values of FIG. 11 with another error component;

FIG. 16 shows a graphical representation illustrating the calculation of a plurality of complete possible error values;

FIG. 17 shows a graphical representation of thresholding the further modified subpixel values;

FIG. 18 shows a graphical representation of determining of number of subpixels exceeding or equal to a threshold value;

FIG. 19 shows a graphical representation of selecting one of the plurality of possible complete error values;

FIG. 20 is a block diagram illustrating implementation of the processes illustrated in FIGS. 11–19;

FIG. 21 is a block diagram illustrating circuitry implementation of the processes illustrated in FIGS. 11–19; and FIG. 22 is a block diagram illustrating a hybrid high addressable error diffusion circuit utilizing background error diffusion according to one embodiment of the present invention.

DETAILED DESCRIPTION OF THE PRESENT INVENTION

Figure 1:
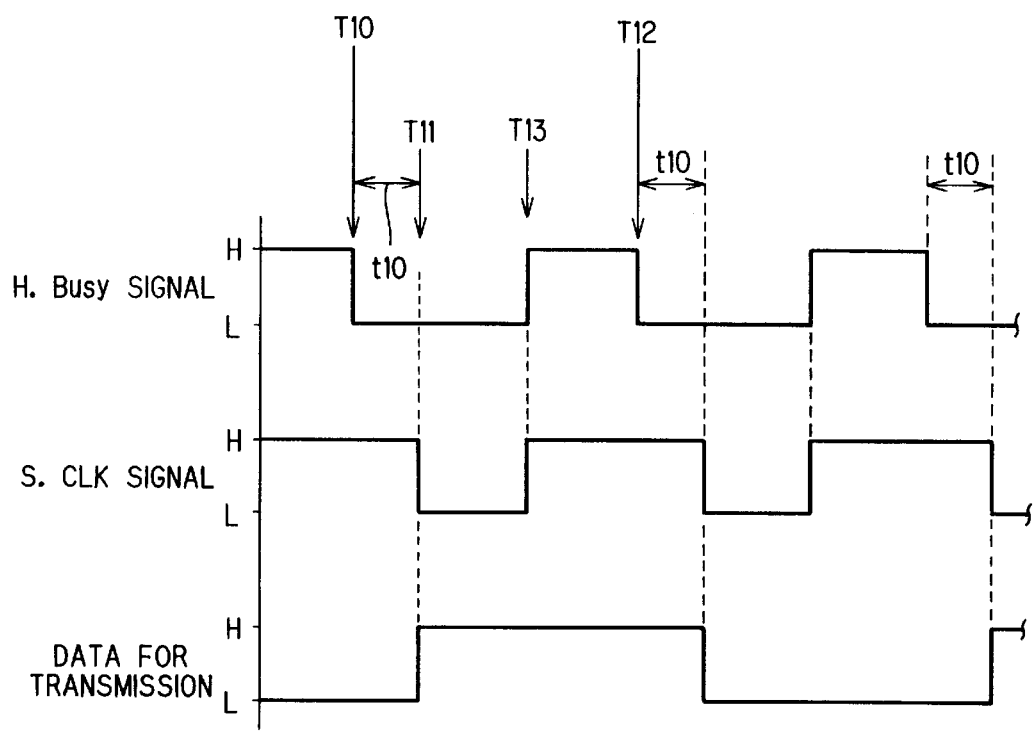
FIG. 1 shows a graphical representation of obtaining boundary subpixel values.
Figure 2:
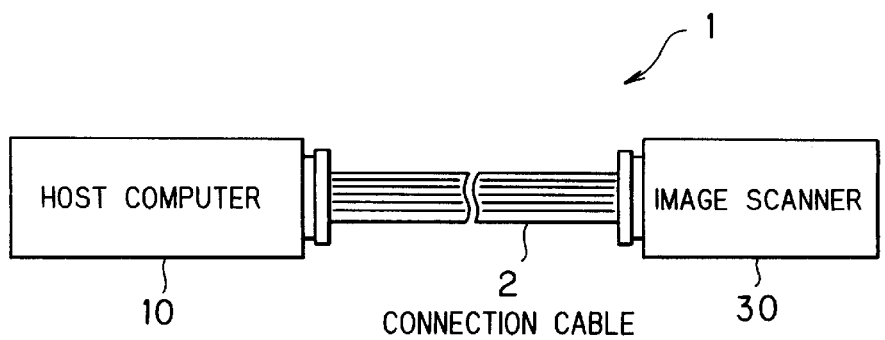
FIG. 2 shows a graphical representation of modifying the obtained boundary subpixel values with an error component.

The following will be a detailed description of the drawings illustrating the present invention.

Conventionally, the image processing architecture of a printing system uses either the functions of screening, thresholding, or error diffusion. For pixels to be thresholded, a modified video signal, $V_T'$, is computed from the pixel video signal V. The modified video signal, $V_T'$, is defined as $V_T'=(T+255-V)/2$ in a system having 256 grey levels. In this definition, T is the desired threshold level. It is noted that for T and V between 0 and 255, the computed V' will also be in the range of 0 to 255.

For pixels to be screened, a similar modified video signal, $V_S'$, is computed from the pixel video signal V and the screen value S at the pixel location. The modified video signal, $V_S'$, for a screening process is defined as $V_S'=(S+255-V)/2$ in a system having 256 grey levels. The screen value S depends on the pixel location as well as the halftone screening pattern being used. It is noted that either a line screen or a dot screen can be used.

For pixels to be rendered by error diffusion, the modified video signal is simply the video signal inverted. More specifically, the modified video signal is defined as $V_{ED}'=255-V$ in a system having 256 grey levels.

In the final step of binarization, all the modified video signals; $V_T'$, $V_S'$, and $V_{ED}'$; are compared with 128 to determine the ON or OFF characteristics of the pixel. Namely, if the modified video signal is greater than or equal to 128, the pixel should be OFF (black), otherwise it should be ON (white). It is noted that this gives the same result as the more typical approach of comparing the video V itself with the threshold T or the screen values S. In the case of error diffusion, the appropriate error propagated from the previous pixels must be added to V' before comparing with 128 and the error to be propagated to downstream pixels must also be computed afterwards.

However, it is desirable to screen the video signal at a higher frequency while maintaining the available number of grey levels. To realize this result, it has been proposed to utilize an image processing system which performs a screening process prior to an error diffusion process. More specifically, this hybrid error diffusion process, in a system having 256 grey levels, first computes the modified video signal $V_S'$ utilizing a preferred screening method of $V_S'=(G_L-V_i)+(S_i-Th)$ wherein $S_i$ is equal to screen values derived from a halftone screen pattern, $V_i$ is the grey input video, $G_L$ is a maximum grey level value for a pixel in the system, and Th is the threshold values used in the binarization process. This computation uses screen values from a small screen cell. After computing the modified video signal $V_S'$, the signal $V_S'$ is processed by an error diffusion process. In the preferred embodiment of the hybrid error diffusion system, this error diffusion process is a high addressability error diffusion process.

An example of such a system will be briefly discussed. In the hybrid system, an unmodified video or image signal is screened by a modulator to produce a modified signal $V_S'$ using the preferred equation of $V_S'=(G_L-V_i)+(S_i-Th)$ wherein $S_i$ is equal to screen values derived from a halftone screen pattern, $V_i$ is the grey input video, $G_L$ is a maximum grey level value for a pixel in the system, and Th is the threshold value used in the binarization process. This modified signal $V_S'$ is fed into an adder where the signal is further modified by the addition of an error value propagated from upstream processed pixel locations to produce $V_S''$ ($V_S''= V_S'+e_i$). The error component ($e_{FIFO}+e_{FB}$) utilized by the adder is received from an error buffer ($e_{FIFO}$) which stores the propagated error and a binarization circuit ($e_{FB}$).

The further modified signal $V_S''$ is fed into the binarization circuit which converts the multi-level modified signal $V_S''$ to a binary output by utilizing an error diffusion/threshold process. Some of the error ($e_{FB}$) from this process is fed back directly to the next to be processed pixel, while the rest ($e_{FIFO}$) is stored in the error buffer for processing of pixels in the next scanline. The apportionment of the error is based on weighting coefficients. Any set of coefficients can be used. In the preferred embodiment of the present invention, the weighting coefficients are the coefficients described in U.S. Pat. No. 5,353,127. The entire contents of U.S. Pat. No. 5,353,127 are hereby incorporated by reference.

In this binarization process, the error that is produced represents the difference between the desired output, the multi-level image data value, and the actual output value which is either 255 or 0 if the multi-level of the image data is represented by 8 bits. This error is diffused, thereby retaining as much grey level information as possible.

As noted above, in the preferred embodiment the error diffusion process is a high addressability error diffusion process; therefore, the screening/high addressability error diffusion process will be explained in more detail below. Initially, the high addressability error diffusion process will be briefly described.

To extend the conventional or hybrid error diffusion process, described above, to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the hybrid high addressability error diffusion process, it is assumed that the input grey levels at pixel location i and pixel location i+1 are represented by $V_i$ and $V_{i+1}$, respectively, wherein $V_i'=(G_L-V_i)+(S_i-Th)$, and $V_{i+1}'=(G_L-V_{i+1})+(S_{i+1}-Th)$. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

With respect to a first interpolation scheme, the steps for determining the printing or rendering of a subpixel are as follows.

Initially, the modified pixel values $P0_i=V_i'+e_i$ and $P1_i=V_{i+1}'+e_{i+1}$ are computed wherein $V_i'=(G_L-V_i)+(S_i-Th)$, and $V_{i+1}'=(G_L-V_{i+1})+(S_{i+1}-Th)$. The subpixels are denoted by 0 to N−1 wherein the high addressability characteristic is N. The high addressability characteristics is the number of subpixels that a printer can produce compared to the throughput bandwidth of the image processing system. In other words, the high addressability characteristic defined as the number of subpixels that the image output terminal can render from one pixel of image data.

High addressability is important in situations where the device can process the image data at one resolution, but print at a higher resolution. In such a situation, the present invention can take advantage of a processing system designed for a lower resolution image, (lower resolution can be processed quicker and less expensively), and a printing device which, through laser pulse manipulation, can print at a higher resolution. For example, the image can be processed at 600×600×8 and printed at 2400×600×1 using the high addressability process of the present invention. In the above example, the high addressability characteristic is 4. If the image was processed at 600×600×8 and printed at 1200×600×1, the high addressability characteristic would be 2.

The interpolated subpixel values are computed as $B_n=P0+n(P1-P0)/N$ for n=0 to N−1. The interpolated subpixel values are then compared with a threshold value which in most cases is 128, assuming that the video value ranges from 0 to 255 ($G_L$ is equal to 255). If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N, wherein y is the number of subpixels turned ON. The error is then multiplied by a set of weighting coefficients and distributed to the downstream pixels as in the first version.

More specifically, the screened inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

An example of the hybrid high addressability error diffusion process discussed above will be described briefly. In this example, the values $P0_i$ and $P1_i$ are calculated as described above. Next, the X-coordinate of the point of intersection of a line between $P0_i$ and $P1_i$ and a line representing a threshold value is determined and normalized by multiplying the difference between 128 and P0 by the value N and dividing this product by the difference of P1 and P0. The normalized value X is compared with the value 0. If X is less than or equal to 0, the process compares the value P1 with the value 128. If the value P1 is greater than or equal to 128, all the subpixels are set to an ON state. However, if P1 is less than 128, the process sets all the subpixels to an OFF state.

On the other hand, if it is determined that X is not less than or equal to 0, it is determined the integer value of X and sets this integer value equal to Y. The integer value Y is compared with the values 0 and N. If the value Y lies between 0 and N, the process determines whether the value P1 is less than or equal to 128. If the value P1 is less than or equal to 128, the process sets the subpixels 0 to Y to the ON state and the subpixels Y+1 to N to the OFF state. However, if it is determined that the value P1 is greater than 128, the process sets the subpixels 0 to Y to the OFF state and the subpixels Y+1 to N to the ON state.

If it is determined that the value Y is not between the values 0 and N, it is determined whether the value P1 is greater than or equal to 128. If the value P1 is greater than or equal to 128, the process sets all subpixels to the ON state. However, if it is determined that the value P1 is less than 128, the process sets all the subpixels to the OFF state.

Upon completing the subpixel setting processes, the error to be propagated to the downstream pixels is calculated. Namely, the error is calculated to represent the original low spatial resolution. Upon calculating the error, the error is multiplied by weighting coefficients and distributes the weighted error terms to downstream pixels.

The second interpolation method with respect to implementing the high addressability error diffusion method of the present invention will be describe as follows.

In this second interpolation method, the modified pixel values $P0_i=V'_i+e_i$ and $P1_i=V_{i+1}'+e_i$ are computed wherein $V_i=(G_L-V_i)+(S_i-Th)$ and $V_{i+1}=(G_L-V_{i+1})+(S_{i+1}-Th)$. In this example, the P0 and P1 values are computed as noted above. Next values Y and Z are set equal 0, wherein Y denotes the number of subpixels which are to be turned ON and Z is a subpixel counter. Then, Z is compared with N to determined whether all the subpixels within the modified video signal have been thresholded. If it is determined that subpixels remain to be thresholded, the next subpixel value is computed. The process then compares the computed subpixel value with the threshold value, namely 128. If the subpixel value is greater than or equal to the threshold value, the process sets the subpixel value to the ON state, and the value Y is incremented indicating the number of subpixels that are set ON. However, if the subpixel value is less than 128, the subpixel value is set to OFF.

Upon the completion of the above, the process increments the counter Z. This subroutine is repeated until all subpixel values within the modified video signal are compared with the threshold value. Upon completing the comparison of all subpixel values, the number of ON subpixels are given by Y. Next, the error from the threshold process is calculated so that the value represents the original lower spatial resolution. Upon calculating the error, the process multiplies the error by weighting coefficients and distributes the error to downstream pixels.

FIGS. 1–7 illustrate the computational steps required to perform high addressability error diffusion using a particular interpolation scheme. Initially, as illustrated in FIG. 1, the pixel value $V_i'$ and $V_{i+1}'$ are obtained wherein $V'_i=(G_L-V_i)+(S_i-Th)$ and $V'_{i-1}=(G_L-V_{i-1})+(S_{i-1}-Th)$. The actual pixel values are graphically illustrated in FIG. 1, wherein the pixel value $V'_i$ represents the pixel value at the subpixel position 0 and the pixel value $V'_{i+1}$ represents the pixel value at the N subpixel. In FIG. 1, the pixel values range from 0 to 255 utilizing a conventional eight-bit dataword to represent the multi-level grey value of the image data to be process. It is noted that any range can be utilized to represent the grey level value of the image data; for example, 0 to 511, 0 to 127, etc.

After obtaining the initial pixel values of $V'_i$ and $V_{i+1}'$, a diffused error component $e_i$ (the accumulated error from previous pixel binarization processes) is added to the pixel values $V'_i$ and $V_{i+1}'$. It is noted that the error component $e_i$ consists of two components, $e_{FIFO}$ and $e_{FB}$, where $e_{FIFO}$ is the summed error component stored in a line buffer and $e_{FB}$ is the feedback error component. The adding of the error component $e_i$ is illustrated graphically in FIG. 2.

Figure 3:
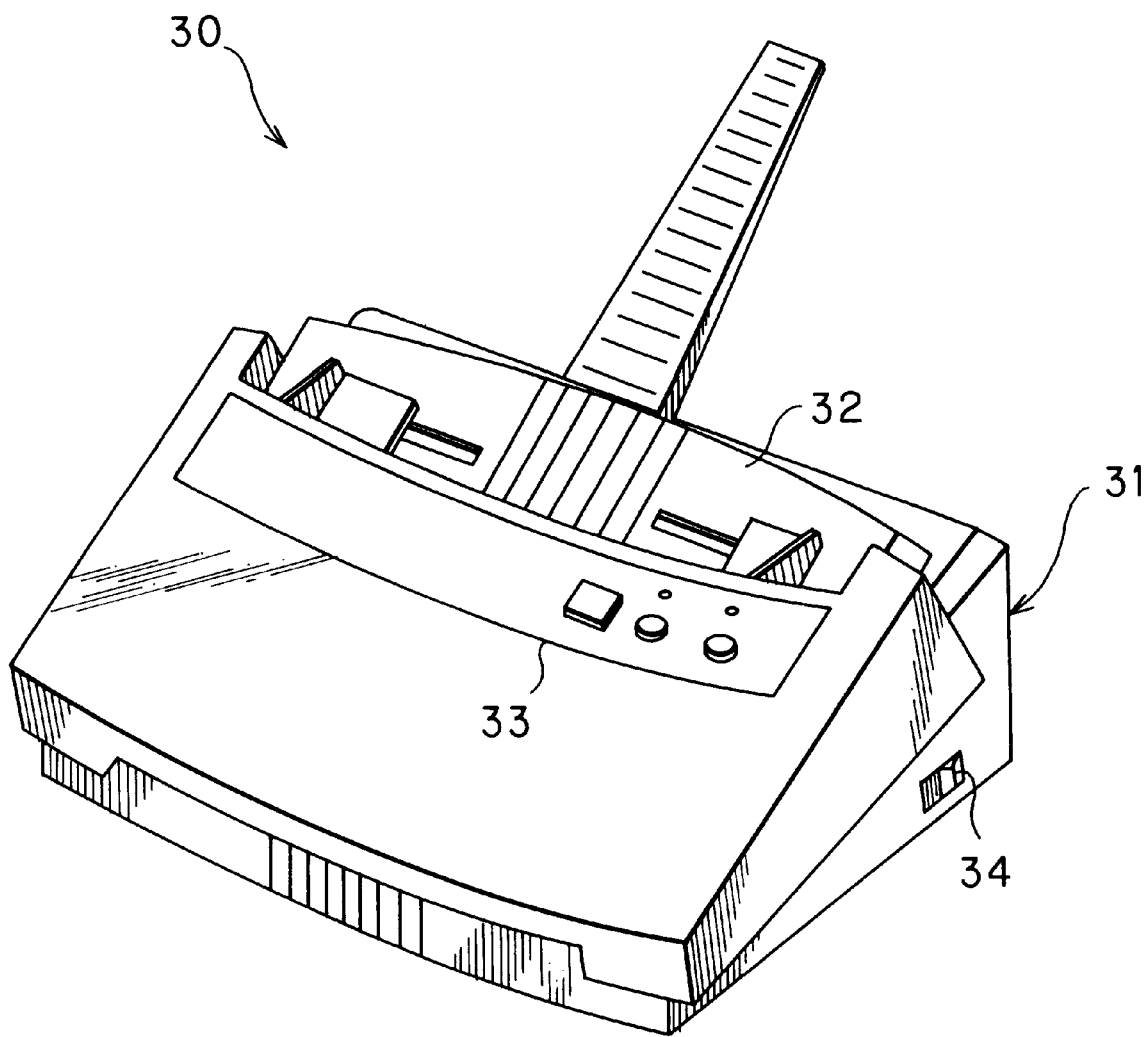
FIG. 3 shows a graphical representation of interpolating subpixel values between the modified boundary subpixel values.
Figure 4:
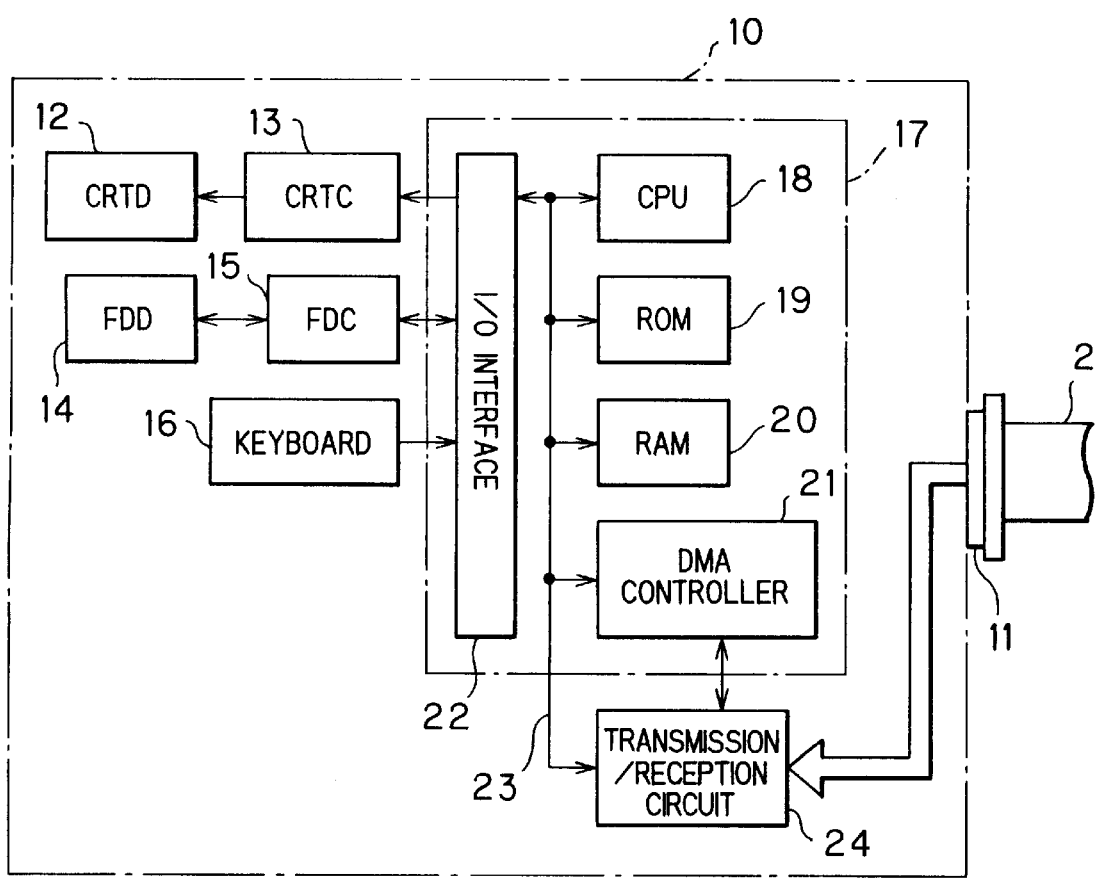
FIG. 4 shows a graphical representation of comparing the interpolated subpixel values with a threshold value.
Figure 5:
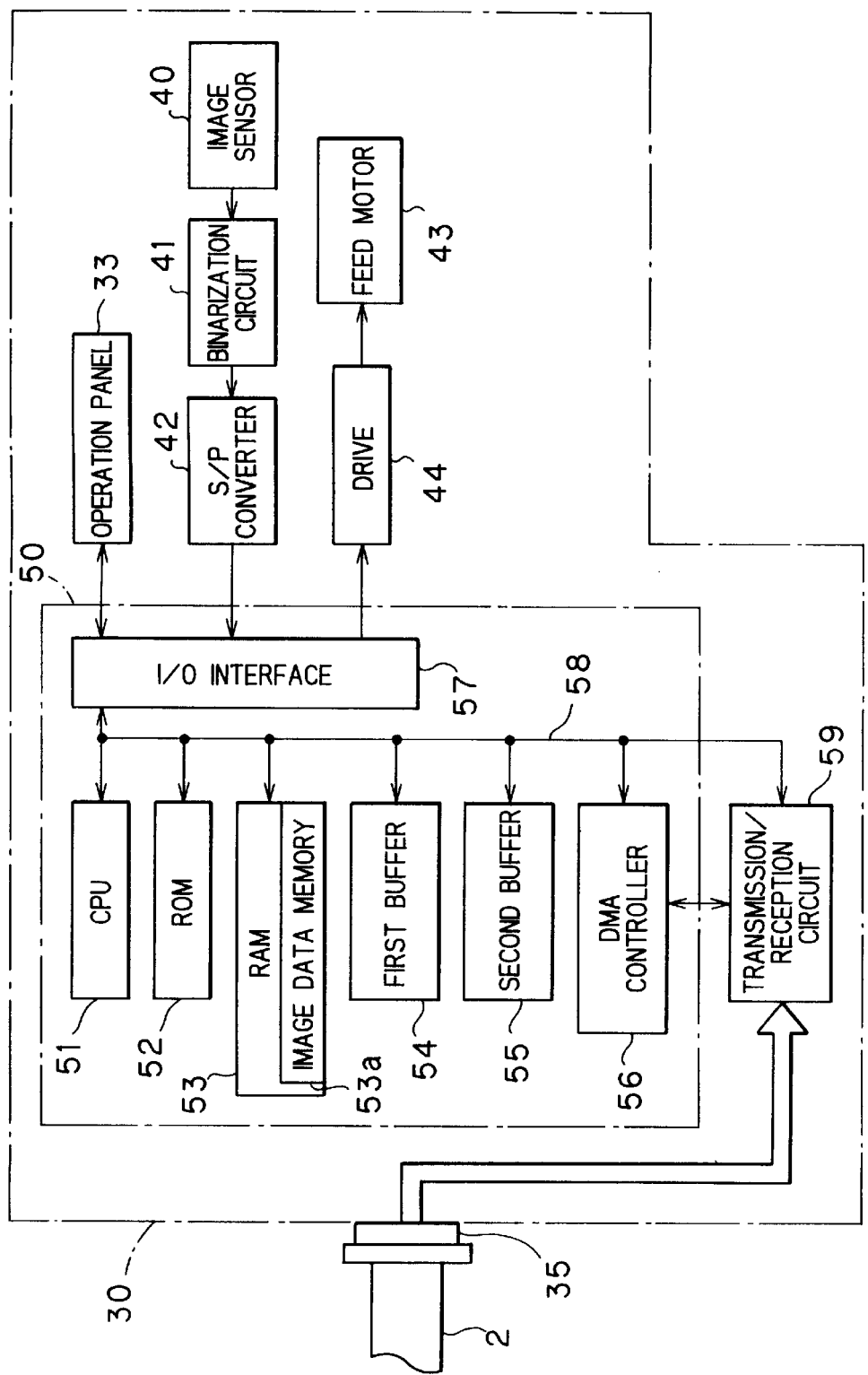
FIG. 5 shows a graphical representation of computing a desired output value.

After adding the diffused error component, the interpolated subpixel values are computed, as illustrated in FIG. 3. For example, the interpolated subpixel values are $B_n=P0_i+n(P1_i-P0_i)/N$ for n=0 to N-1, where N is the selected high addressability characteristic. It is noted that the value $P0_i$ is equal to $V'_i+e_i$ and $P1_i$ is equal to $V_{i+1}'+e_i$.

After computing the interpolated subpixel values, each interpolated subpixel value is compared to a threshold level. In the example illustrated in FIG. 4, the threshold value is 128. It is noted that this threshold value can be any value within the range of the image data depending upon the desired results. In this example, each subpixel which has a value greater than or equal to 128 is set ON.

Figure 6:
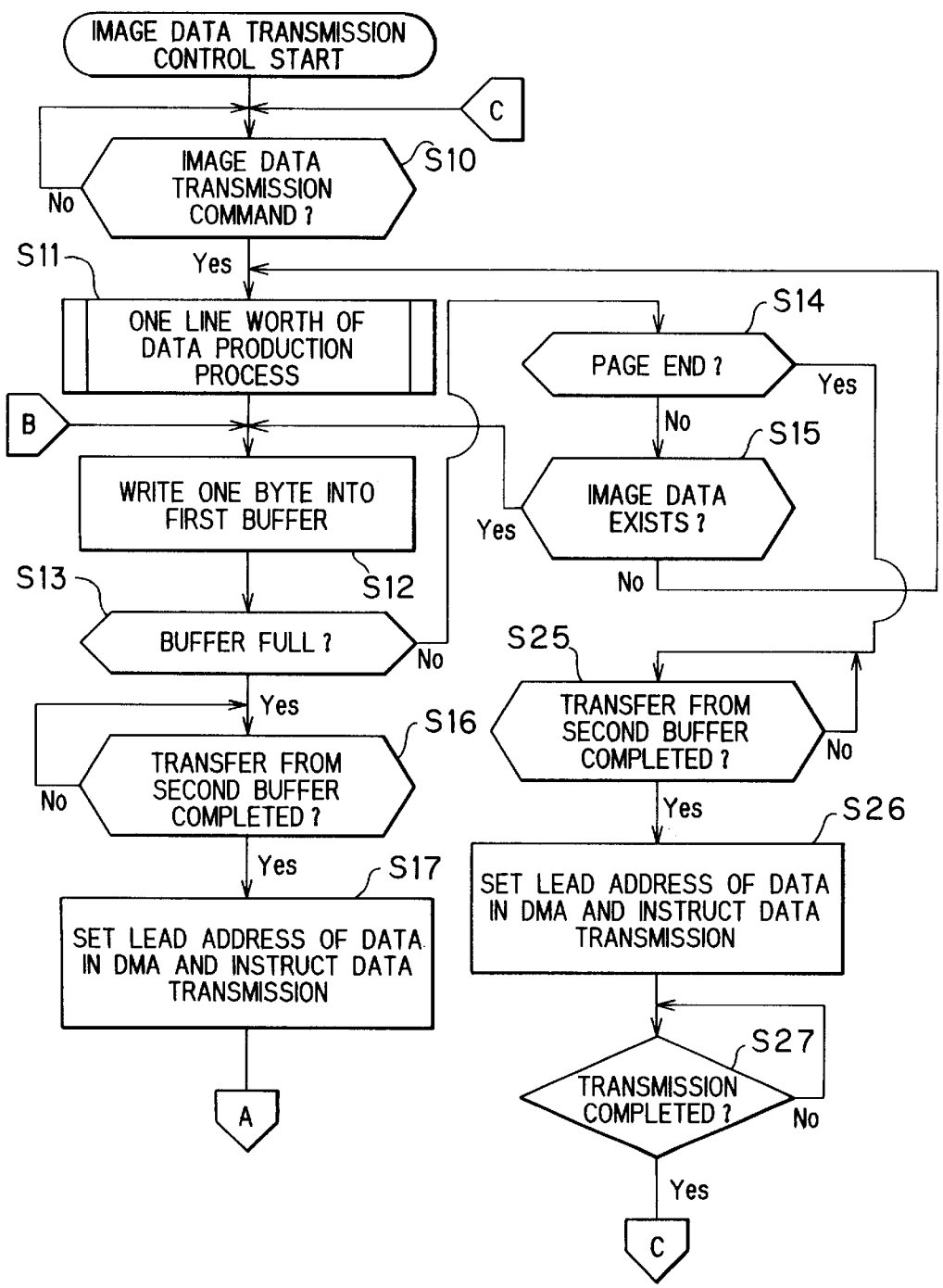
FIG. 6 shows a graphical representation of computing an actual output value.

Next, the desired output $(P0_i+P1_i)/2$ is computed. This computing of the desired output is graphically illustrated in FIG. 5. After computing the desired output, the actual output is computed. In this example, the actual output is equal to n*255/N where n is the number of subpixels that have been turned ON as the result of the comparison illustrated in FIG. 10. A graphical representation of the computed actual output is shown in FIG. 6. Once the desired output and the actual output have been computed, the error diffusion method computes the error to be propagated downstream. This error is computed as the desired output minus the actual output. A graphical representation of this computation is shown in FIG. 7.

Figure 7:
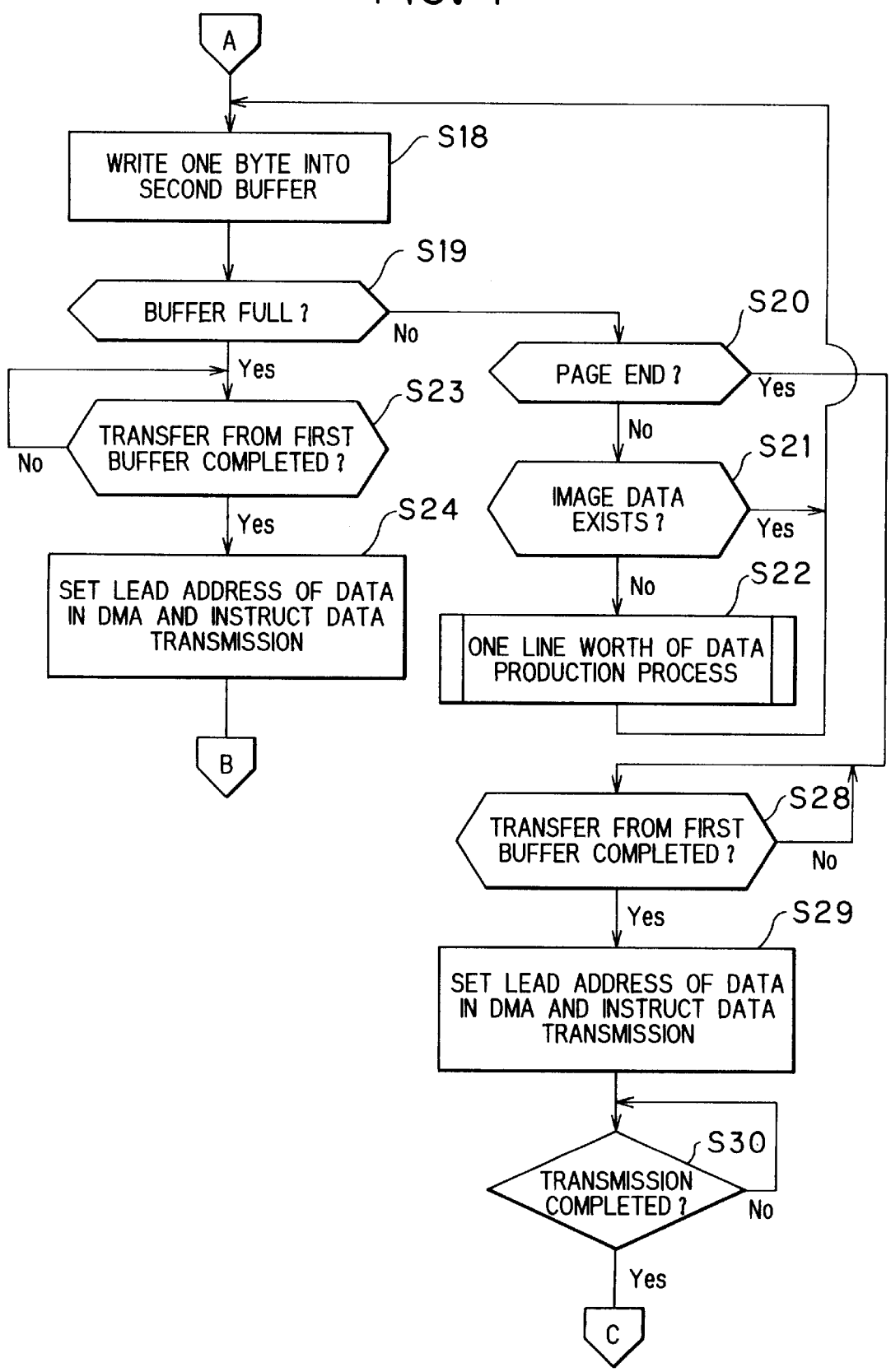
FIG. 7 shows a graphical representation of computing an error value to be propagated to downstream pixels.
Figure 8:
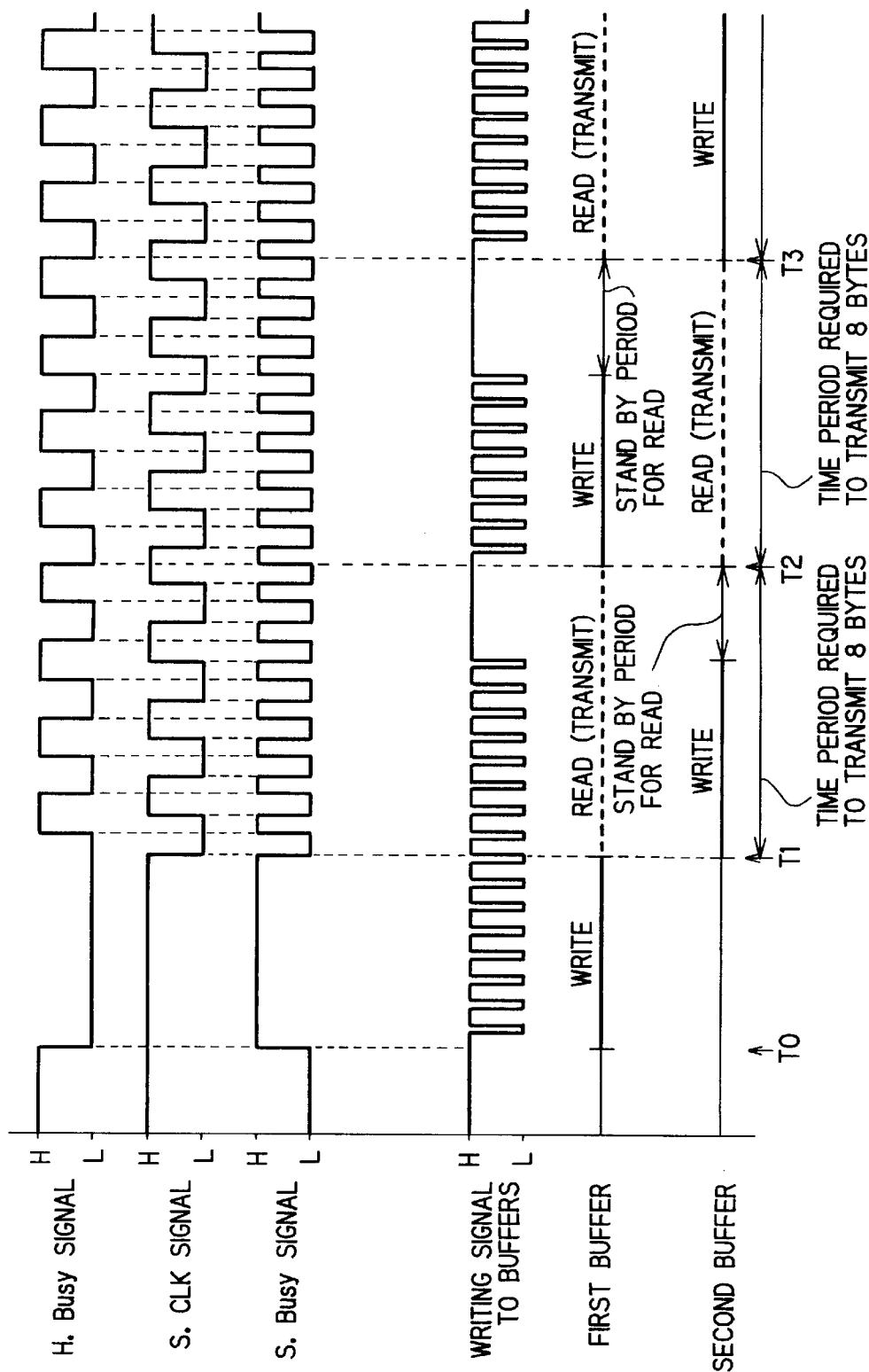
FIG. 8 shows a graphical representation illustrating actual distribution of the error in a typical error distribution routine.

As illustrated in FIG. 7, the error is calculated to be $e_{i+1}=(P0_i+P1_i)/2-(n*255/N)$. In this instance, the error $e_{i+1}$ represents the error from the present binarization process. As in all conventional error diffusion processes, the error from the binarization process is distributed to downstream pixels. The distributing of the error $e_{i+1}$ to downstream pixels is illustrated in FIG. 8. In this example, the distribution of error utilizes a set of error diffusion coefficients which allow fast processing by simple bit shifting. FIG. 8 illustrates the coefficients associated with each pixel location.

Figure 9:
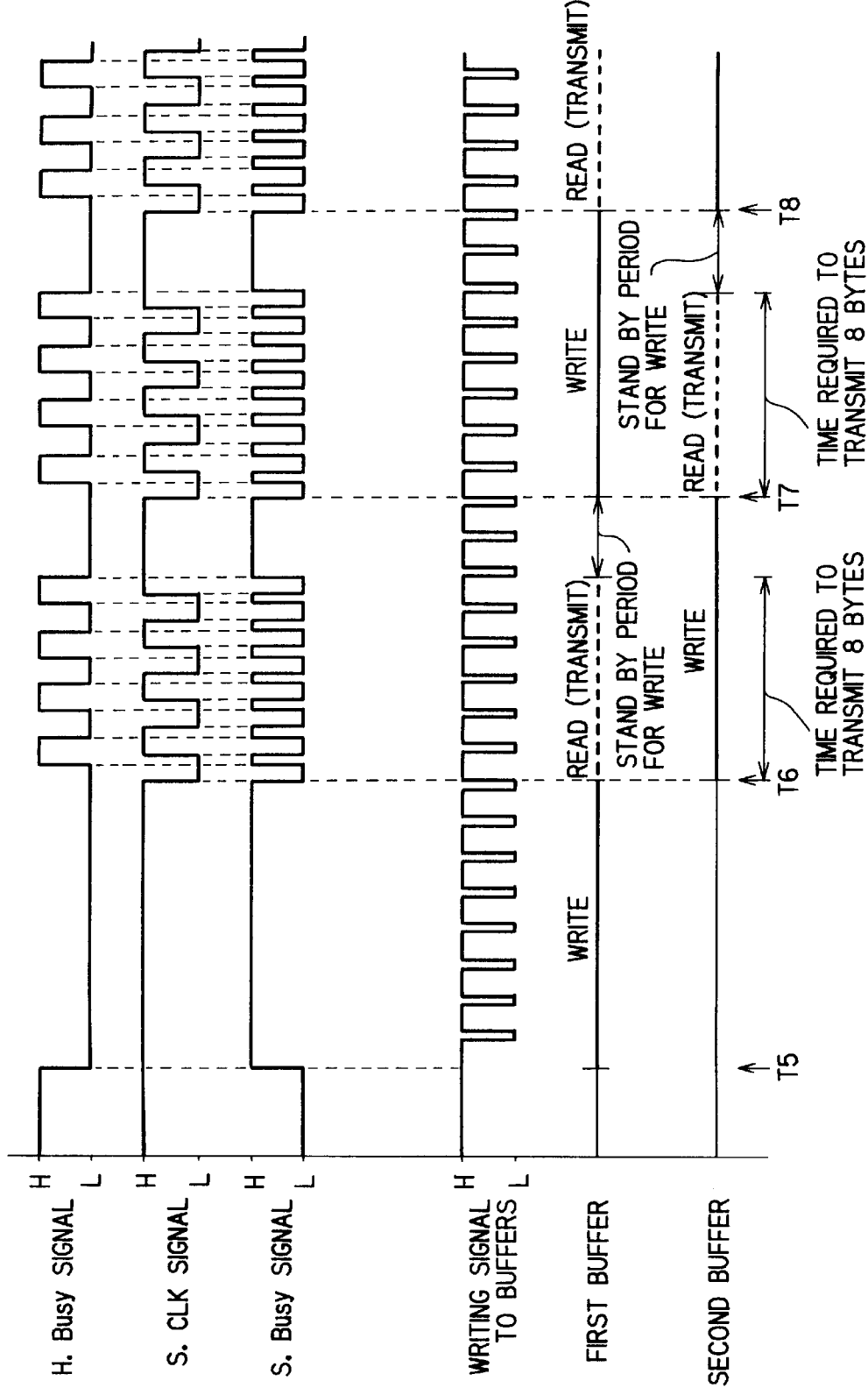
FIG. 9 shows a block diagram illustrating one embodiment of the present invention implementing a high addressability error diffusion process.

FIG. 9 illustrates a circuit for implementing the above described process. In FIG. 9, the screened input video signal is split and latched in latch 101 so as to produce the screened pixel values $V0_i$ and $V1_i$. $V0_i$ represents the latched screened input video signal $V1_i$ as noted above, and $V0_i$ represents the screened pixel value just proceeding the screened pixel value $V1_i$ in the same scanline. The screened pixel value $V0_i$ is fed into an adder 103 with the error component $e_i$. Moreover, the error component $e_i$ is fed into an adder 105 along with the screened input video signal $V1_i$. The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value $(128-P0_i)$ can be multiplied by the high addressability characteristic value N. The resulting product is then divided by the sum from adder 109 by a divider circuit 117. The resulting quotient is fed into a decoder 119. The actual function of decoder 119 is graphically illustrated in FIG. 10.

More specifically, the decoder 119, as illustrated in FIG. 10, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value (−255/N). The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_B$ is distributed to the next pixel in the same scanline and the other half of the error $Err_A$ is distributed to various pixels in the next scanline according to the weighting coefficients established in the error distribution circuit 127.

FIG. 11 illustrates two parallel computations which are carried out in the present invention. More specifically, FIG. 11 illustrates that the screened pixel values $V_i$ and $V_{i+1}$ are obtained in parallel to the beginning of the computation of the desired output for a single subpixel wherein the desired output is computed without including the diffused error components $e_{FIFO}$ or $e_{FB}$.

After these parallel computations are completed, the preferred embodiment of the present invention computes interpolated subpixel values in the same way as illustrated in FIG. 3. However, in parallel with this computation of the interpolated subpixel values, the desired output is continued to be computed by adding the error component $e_{FIFO}$. This is graphically represented in FIG. 12.

Next, the error component $e_{FIFO}$ is added to the screened pixel values $V_i$, and $V_{i+1}$ and the interpolated subpixels as illustrated in FIG. 13. At the same time (in parallel thereto), all possible actual subpixel outputs are subtracted from the desired output without including the diffused error component $e_{FB}$. In other words, N possible actual subpixel outputs are subtracted from the desired output computed in FIG. 12 to produce N possible error outputs $e_p$ (the desired output minus the actual output is equal to the error $e_p$). The computations illustrated in FIG. 13 are carried out in parallel with the computations illustrated in FIG. 14.

The error component $e_{FB}$ is added to the screened pixel values $V_i$, $V_{i+1}$, and the various interpolated subpixel values as illustrated in FIG. 15. At the same time that the feedback error component $e_{FB}$ is being added in FIG. 15, the error component $e_{FB}$ is added to all possible subpixel desired outputs as illustrated in FIG. 16. In other words, the error component $e_{FB}$ is individually added to all N error results ($e_p$) stemming from the calculations illustrated by FIG. 14.

After completing these parallel computations, the next step includes the computations illustrated in FIGS. 17, 18, and 19. In this next step, each interpolated subpixel value is compared to a threshold value of 128, and the subpixels having a value greater than or equal to the threshold value are turned ON. This process is graphically illustrated in FIG. 17 and 18 wherein FIG. 17 shows the comparison of the interpolated subpixel values with the threshold values, and FIG. 18 shows the turning ON of the subpixels which have a value greater than or equal to the threshold value.

Since all the possible error values were made simultaneously available as a result of the computations illustrated in FIG. 16, the error to be propagated downstream can now be immediately selected; i.e., via a multiplexer, based upon the number of subpixels which are turned ON. In other words, FIG. 19 illustrates the properly selected error value from the various simultaneously available error values produced by the computations illustrated in FIG. 16. The selected error value is then distributed to downstream pixels utilizing any conventional error diffusion technique. In the preferred embodiment of the present invention, the error is distributed to downstream pixels utilizing the error diffusion coefficients discussed above.

FIG. 20 illustrates a functional block diagram of the parallel pipeline high addressability error diffusion circuit of the preferred embodiment of the present invention. In FIG. 20, the input screened video signal is fed into an error calculation circuit 1 and a video modification circuit 3. The error components $e_{FIFO}$ ($Err_B$) and $e_{FB}$($Err_A$) are also fed into the error calculation circuit 1. The error calculation circuit calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection.

As illustrated in FIG. 20, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

FIG. 21 illustrates a detail block diagram of a high addressable error diffusion circuit according to the present invention. As illustrated in FIG. 21, many of the computations, as previously described with respect to FIGS. 11–19, are carried out in parallel.

Screened pixel values $V_i$ and $V_{i+1}$ are obtained by the utilization of a latch 205 which latches the screened video signal so that two adjacent fastscan pixels are available for processing. The screened pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N+1 possible actual outputs will be generated. Also in parallel to the above described process, a subpixel circuit generated all the interpolated subpixels based on the screened pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N+1 possible actual subpixel outputs are subtracted from the desired output to produce N+1 possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to down stream pixels. The error term is selected based on a control signal received from the decode logic circuit 213. The selected error term is fed into a distribution circuit 204 which produces the next feedback error and the error to be stored in a buffer for utilization in the processing of the next scanline.

As noted above, when processing a segmented document, there may be numerous non-error diffused regions where different image processing rendering is desired, such as screening or thresholding, but where no error is generated. More specifically, it is conventional to segment an image into regions corresponding to the type of image processing routines are to be performed on that region. This is realized by utilizing a conventional image processing system as described in U.S. Pat. No. 5,513,282. The entire contents of U.S. Pat. No. 5,513,282 are hereby incorporated by reference.

However, when utilizing conventional segmentation routines, various artifacts may appear at the boundaries of the regions due to the change in the image processing routines. For example, to process an image properly using error diffusion, error from the processing of surrounding pixels is needed to process the region without undesirable artifacts. If the region that is being left is a non-error diffused region, there will be no error available for the error diffusion process, and thus, artifacts will appear in the rendered image. The following is an example of such an artifact.

Discontinuity is one artifact that is experienced at boundaries between non-error diffused regions and error diffused regions. More specifically, one may observe a discontinuity between an error-diffused and non-error-diffused segmented region within a document if the error, which is normally from a buffer (error from the slowscan direction), that is being used when processing the first scanline of the error-diffused window is zero. For example, when rendering a grey sweep where the top most half is rendered by some non-error diffused processing method such as screening or thresholding, the start up effect that is observed in the highlight regions of the sweep is due to the absence of the slowscan error information being available at the onset of the error diffused window. This start up effect appears as a rounding of the image when a sharp edge is expected. It takes a number of scanlines for the error to reach a steady state value within these areas, ultimately rendering a smooth periodic output.

FIG. 22 illustrates a preferred embodiment of a circuit of the present invention which substantially eliminates the start up effect that occurs at the boundaries between error diffused regions and non-error diffused regions. As illustrated in FIG. 22, many of the computations, as previously described with respect to FIGS. 11–19, are carried out in parallel.

Screened pixel values $V_i$ and $V_{i+1}$ are obtained by the utilization of a latch 205 which latches the screened video signal so that two adjacent fastscan pixels are available for processing. If no screening is desired, the screen values added to the video signals would be zero or some other predetermined constant value. The screened pixel values $V_i$ and $V_{i+1}$ are summed in adder 206 and the sum is divided in half by divider 207. The result from divider 207 is fed into adder 208 with the error term $e_{FIFO}$. The sum represents the desired output to the printer.

In parallel to the above described process, an actual output generation circuit 200 produces all possible outputs to the printer based on the high addressability characteristic. It is noted that these values are negative since an adder is used for subtraction operations. If the high addressability characteristic is N, N+1 possible actual outputs will be generated. Also in parallel to the above described process, a subpixel circuit generated all the interpolated subpixels based on the screened pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N+1 possible actual subpixel outputs are subtracted from the desired output to produce N+1 possible error outputs.

In adders 211 and 202, a feedback error term $e_{FB}$ is added to each summation from adders 210 and 201, respectively. With respect to adder 211, the feedback error term $e_{FB}$ comes from multiplexer 217 which selects between an actual feedback error and zero. The selection is based on the value of a window bit. This window bit depends on the binarization process suitable for the pixel classification as determined from the image segmentation process. When the window bit is asserted (error diffusion and hybrid error diffusion processing is the desired processing routine), the actual error feedback value is selected. On the other hand, when the window bit is not asserted (thresholding, grey thresholding, screening, cellTRC processing, or a bypass mode is the desired processing routine), the value of zero is selected. These computations are carried out in parallel.

After completing these parallel computations, each interpolated subpixel from adder 211 is compared to a threshold value in threshold circuit 212. The subpixels having a value greater than or equal to the threshold value are turned ON. Threshold circuit outputs a number representing the number of subpixels turned ON. This information is fed into a decode logic circuit 243 which produces a binary therefrom to be sent to a printer. In parallel to these threshold processes, the value of $V_i+E_{FIFO}+E_{FB}$ is compared with the threshold value by comparator 221. The results of the comparison is fed into decode logic circuit 243.

Moreover, the error terms from adder 202 are fed into a multiplexer 203 which chooses which error term to propagate to down stream pixels. The error term is selected based on a control signal received from the decode logic circuit 243. The selected error term is fed into a distribution circuit 204 which produces the next feedback error and the error to be stored in a buffer for utilization in the processing of the next scanline.

The error selected by the multiplexer 203 is based on the output from the decode logic circuit 243. If the window bit (window bit is fed to decode logic circuit 243) is asserted (error diffusion and hybrid error diffusion processing), the decode logic circuit produces a signal which enables the multiplexer to select the proper error based on the number of subpixels turned ON. On the other hand, if the window is not asserted (error diffusion and hybrid error diffusion processing is not the desired processing routines), the decode logic circuit produces a signal which enables the multiplexer to select the maximum error value (the top channel of the possible error values between circuits 202 and 203 as illustrated in FIG. 22) when the comparator determines that the value $V_i + E_{FIFO} + E_{FB}$ is below the threshold value and to select the minimum error value (the bottom channel of the possible error values between circuits 202 and 203 as illustrated in FIG. 22) when the comparator determines that the value $V_i + E_{FIFO} + E_{FB}$ is above the threshold value.

In the example described above, the background error diffusion calculation is accomplished in the same manner as a conventional error diffusion circuit i.e., the high addressability of 1. In segmented regions designated as non-error diffused areas with a high addressability greater than 1, the background error diffusion calculation is less precise using this circuit. However, it provides a continuous error computation for all pixels in the image including those in the non-error diffused area. Moreover, in error diffused regions, the error calculation is equal to the number of high addressable bits selected.

By utilizing the background error diffusion of the present invention, the artifacts seen in the grey sweep within the highlight regions are significantly reduced. More specifically, when utilizing background error diffusion, the startup effect around the window interface region is substantially reduced. Thus, the present invention provides a method of utilizing background error diffusion which results in a much smoother interface between the two segmented regions.

In describing the present invention, the terms pixel and subpixel have been utilized. These terms may refer to an electrical (or optical, if fiber optics are used) signal which represent the physically measurable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation In other words, in this situation, a pixel is an electrical (or optical) representation of the physical optical properties of a physical image measured at a physically definable area on an optical sensor.

Moreover, in describing the present invention, the terms error diffused region and non-error diffused regions have been utilized. These terms refer to regions in an image that have been segmented for specific image processing operations. For example, in the error diffused regions, the region (window) of the image has been segmented or classified as being a region upon which an error diffusing routine will be performed (conventional error diffusion, hybrid error diffusion, high addressability error diffusion, or hybrid high addressability error diffusion). In non-error diffused regions, routines other than error diffusion are to be performed; i.e., thresholding, screening, etc.

Although the present invention has been described in detail above, various modifications can be implemented without departing from the spirit of the present invention. For example, the preferred embodiment of the present invention has been described with respect to a printing system; however, this screening/error diffusion method is readily implemented in a display system. Moreover, the screening and high addressability error diffusion method of the present invention can be readily implemented on an ASIC, programmable gate array, or in software, thereby enabling the placement of this process in a scanner, electronic subsystem, printer, or display device.

Moreover, various examples of the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level output terminal or higher.

Furthermore, the present invention has been described in a high addressable environment, but it can be readily implemented in any image processing environment which segments the image into classifications and one of the classification is associated with error diffusion. Thus, the high addressable process described above may have a high addressability characteristic of 1.

Lastly, the present invention has been described with respect to a monochrome or black/white environment. However, the concepts of the present invention are readily applicable to a color environment. Namely, error diffusion process of the present invention can be applied to each color space value representing the color pixel.

In recapitulation, the present invention provides an error diffusion method or module which enables an image processing system to convert an electronic document of one format to that of another format without significant rounding effect artifacts.

While the present invention has been described with reference to various embodiments disclosed herein before, it is not to be combined to the detail set forth above, but is intended to cover such modifications or changes as made within the scope of the attached claims.

What is claimed is:

1. A method of reducing a number of levels in a multi-level grey scale pixel value representing a pixel, comprising the steps of:

(a) assigning an image classification to a multi-level grey scale pixel value of a first resolution;

(b) modifying the multi-level grey scale pixel value based on the image classification of the multi-level grey scale pixel;

(c) adding a first error generated from previously processed neighboring pixels to the modified pixel value, if the pixel is classified as an error diffused pixel and no error to the modified pixel value if the pixel is classified as a non-error diffused pixel;

(d) processing the modified multi-level grey scale pixel value based on the assigned image classification to reduce the number of grey levels in the multi-level grey scale pixel value;

(e) generating a second error based on the processing of the modified multi-level grey scale pixel value;

(f) diffusing a portion of the second error to a next pixel in a fastscan direction; and (g) diffusing a remaining portion of the second error to pixels in a slowscan direction.

2. The method as claimed in claim 1, further comprising the step of:

(h) converting the modified multi-level grey scale pixel value to a second resolution prior to the execution of said step (d), the second resolution being higher than the first resolution;

said step (e) generating the second error as a value having a resolution corresponding to the first resolution.

3. The method as claimed in claim 2, wherein said step (h) comprises the substep of:

(h1) computing a plurality of multi-level grey scale subpixel values $B_n$, the multi-level grey scale subpixel values $B_n$ being equal to $P0+n(P1-P0)/N$, wherein n is equal to 0 to N−1, P0 is equal to a first multi-level grey scale pixel value, P1 is equal to a second multi-level grey scale pixel value, and N is equal to a high addressability characteristic.

4. The method as claimed in claim 3, wherein said step (e) comprises the substeps of:

(e1) calculating a desired output, the desired output being equal to a sum of the first and second multi-level grey scale pixel values divided by two;

(e2) calculating an actual output, the actual output being equal to a number of subpixels being equal to or greater than a threshold value multiplied by a maximum grey scale value of a pixel divided by the high addressability characteristic;

(e3) calculating the second error value to be equal to the desired output minus the actual output when the multi-level grey scale pixel is classified as an error diffused pixel;

(e4) selecting a maximum error value output when the multi-level grey scale pixel is classified as a non-error diffused pixel and the modified multi-level grey scale pixel value is less than a threshold value; and (e5) selecting a minimum error value output when the multi-level grey scale pixel is classified as an error diffused pixel and the modified multi-level grey scale pixel value is greater than a threshold value.

5. A system for reducing a number of levels in a multi-level grey scale pixel value representing a pixel, comprising:

segmentation means for assigning an image classification to a multi-level grey scale pixel value of a first resolution;

modifying means for modifying the multi-level grey scale pixel value based on an error generated by a previously processed pixel and the image classification of the multi-level grey scale pixel;

image processing means for processing the modified multi-level grey scale pixel value based on the assigned image classification to reduce the number of grey levels in the multi-level grey scale pixel value;

error means for generating a first error based on the processing of the modified multi-level grey scale pixel value; and diffusion means for diffusing a portion of the first error to a next pixel in a fastscan direction and diffusing a remaining portion of the first error to pixels in a slowscan direction;

said modifying means adding a second error generated by previously processed neighboring pixels if the pixel is classified to be processed as an error diffused pixel and adding no error to the pixel if it is classified to be processed as a non-error diffused pixel.

6. The system as claimed in claim 5, further comprising:

converting means for converting the modified multi-level grey scale pixel value to a second resolution prior to being received by said image processing means, the second resolution being higher than the first resolution;

said error means generating the first error as a value having a resolution corresponding to the first resolution.

7. The system as claimed in claim 6, wherein said converting means computes a plurality of multi-level grey scale subpixel values $B_n$, the multi-level grey scale subpixel values $B_n$ being equal to $P0+n(P1-P0)/N$, wherein n is equal to 0 to N−1, P0 is equal to a first multi-level grey scale pixel value, P1 is equal to a second multi-level grey scale pixel value, and N is equal to a high addressability characteristic.

8. The system as claimed in claim 7, wherein said error means includes:

means for calculating a desired output, the desired output being equal to a sum of the first and second multi-level grey scale pixel values divided by two;

means for calculating an actual output, the actual output being equal to a number of subpixels being equal to or greater than a threshold value multiplied by a maximum grey scale value of a pixel divided by a high addressability characteristic;

means for calculating the error value to be equal to the desired output minus the actual output when the multi-level grey scale pixel is classified as an error diffused pixel;

means for selecting a maximum error value output when the multi-level grey scale pixel is classified as a non-error diffused pixel and the modified multi-level grey scale pixel value is less than a threshold value and for selecting a minimum error value output when the multi-level grey scale pixel is classified as an error diffused pixel and the modified multi-level grey scale pixel value is greater than a threshold value.

9. A method of reducing a number of levels in a multi-level grey scale pixel value representing a pixel, comprising the steps of:

(a) processing a first multi-level grey scale pixel value of a first resolution using a non-error diffusion process;

(b) generating a first error from processing the first multi-level grey scale pixel value;

(c) diffusing the error generated from processing the first multi-level grey scale pixel value to adjacent pixels;

(d) processing a second multi-level grey scale pixel value using an error diffusion process and a portion of the error diffused in said step (c);

(e) generating a second error based on the processing of the second multi-level grey scale pixel value in said step (d); and (f) diffusing the second error generated from processing the second multi-level grey scale pixel value to adjacent pixels.

10. The method as claimed in claim 9, further comprising the step of:

(g) converting the first and second multi-level grey scale pixel values to a second resolution prior to the execution of said steps (a) and (d), the second resolution being higher than the first resolution;

said steps (b) and (e) generating the error values having a resolution corresponding to the first resolution.

11. The method as claimed in claim 10, wherein said step (g) comprises the substep of:

(g1) computing a plurality of multi-level grey scale subpixel values $B_n$, the multi-level grey scale subpixel values $B_n$ being equal to $P0+n(P1-P0)/N$, wherein n is equal to 0 to N−1, P0 is equal to the first multi-level grey scale pixel value, P1 is equal to the second multi-level grey scale pixel value, and N is equal to a high addressability characteristic.

12. A method of reducing a number of levels in a multi-level grey scale pixel value representing a pixel, comprising the steps of:

(a) adding a first error value generated from previously processed neighboring pixels to the multi-level grey scale pixel value if the pixel is classified as an error diffused pixel and adding no error value to the multi-level grey scale pixel value if the pixel is classified as a non-error diffused pixel;

(b) processing the summed multi-level grey scale pixel value based on the classification of the pixel to reduce the number of grey levels in the summed multi-level grey scale pixel value;

(c) generating a second error value based on the processing of the summed multi-level grey scale pixel value; and (d) diffusing the second error value to pixels adjacent to the pixel being processed in said step (b).

13. The method as claimed in claim 12, wherein the multi-level grey scale pixel value corresponds to a first resolution and the method further comprising the step of:

(e) converting the summed multi-level grey scale pixel value to a second resolution prior to the execution of said step (b), the second resolution being higher than the first resolution;

said step (c) generating the second error value having a resolution corresponding to the first resolution.

14. The method as claimed in claim 13, wherein said step (e) comprises the substep of:

(e1) computing a plurality of multi-level grey scale subpixel values $B_n$, the multi-level grey scale subpixel values $B_n$ being equal to $P0+n(P1-P0)/N$, wherein n is equal to 0 to N−1, P0 is equal to a first multi-level grey scale pixel value, P1 is equal to a second multi-level grey scale pixel value, and N is equal to a high addressability characteristic.

15. The method as claimed in claim 14, wherein said step (c) comprises the substeps of:

(c1) calculating a desired output, the desired output being equal to a sum of the first and second multi-level grey scale pixel values divided by two;

(c2) calculating an actual output, the actual output being equal to a number of subpixels being equal to or greater than a threshold value multiplied by a maximum grey scale value of a pixel divided by the high addressability characteristic;

(c3) calculating the second error value to be equal to the desired output minus the actual output when the multi-level grey scale pixel is classified as an error diffused pixel;

(c4) selecting a maximum error value output when the multi-level grey scale pixel is classified as a non-error diffused pixel and the modified multi-level grey scale pixel value is less than a threshold value; and (c5) selecting a minimum error value output when the multi-level grey scale pixel is classified as an error diffused pixel and the modified multi-level grey scale pixel value is greater than a threshold value.

16. A system for reducing a number of levels in a multi-level grey scale pixel value representing a pixel, comprising:

modifying means for modifying the multi-level grey scale pixel value based on an error generated by a previously processed pixel and the image classification of the multi-level grey scale pixel;

image processing means for processing the modified multi-level grey scale pixel value to reduce the number of grey levels in the multi-level grey scale pixel value;

error means for generating a first error based on the processing of the modified multi-level grey scale pixel value; and diffusion means for diffusing the first error to pixels adjacent to the pixel being processed by said image processing means;

said modifying means adding a second error generated by previously processed neighboring pixels if the pixel is classified to be processed as an error diffused pixel and adding no error to the pixel if it is classified to be processed as a non-error diffused pixel.

17. The system as claimed in claim 16, wherein the multi-level grey scale pixel value corresponds to a first resolution and the system further comprising:

converting means for converting the modified multi-level grey scale pixel value to a second resolution prior to being received by said image processing means, the second resolution being higher than the first resolution;

said error means generating the second error value having a resolution corresponding to the first resolution.

18. The system as claimed in claim 17, wherein said converting means computes a plurality of multi-level grey scale subpixel values $B_n$, the multi-level grey scale subpixel values $B_n$ being equal to $P0+n(P1-P0)/N$, wherein n is equal to 0 to N−1, P0 is equal to a first multi-level grey scale pixel value, P1 is equal to a second multi-level grey scale pixel value, and N is equal to a high addressability characteristic.

19. The system as claimed in claim 18, wherein said error means includes:

means for calculating a desired output, the desired output being equal to a sum of the first and second multi-level grey scale pixel values divided by two;

means for calculating an actual output, the actual output being equal to a number of subpixels being equal to or greater than a threshold value multiplied by a maximum grey scale value of a pixel divided by a high addressability characteristic;

means for calculating the error value to be equal to the desired output minus the actual output when the multi-level grey scale pixel is classified as an error diffused pixel;

means for selecting a maximum error value output when the multi-level grey scale pixel is classified as a non-error diffused pixel and the modified multi-level grey scale pixel value is less than a threshold value and for selecting a minimum error value output when the multi-level grey scale pixel is classified as an error diffused pixel and the modified multi-level grey scale pixel value is greater than a threshold value.

20. A method of reducing a number of levels in a multi-level grey scale pixel value representing a pixel, comprising the steps of:

(a) processing a first multi-level grey scale pixel value using a non-error diffusion process;

(b) generating a first error from processing the first multi-level grey scale pixel value;

(c) diffusing the first error generated from processing the first multi-level grey scale pixel value to adjacent pixels; (d) processing a second multi-level grey scale pixel value using an error diffusion process and a portion of the error diffused in said step (c);

(e) generating a second error based on the processing of the second multi-level grey scale pixel value in said step (d); and (f) diffusing the second error generated from processing the second multi-level grey scale pixel value to adjacent pixels.

21. The method as claimed in claim 20, wherein the multi-level grey scale pixel value corresponds to a first resolution and the method further comprising the step of:

(g) converting the first and second multi-level grey scale pixel values to a second resolution prior to the execution of said steps (a) and (d), the second resolution being higher than the first resolution;

said steps (b) and (e) generating the error values having a resolution corresponding to the first resolution.

* * * * *